Oct. 28, 1924.

O. B. DEPUE

FILTRATION APPARATUS

Filed Nov. 18, 1922

Inventor,
Oscar B. Depue,

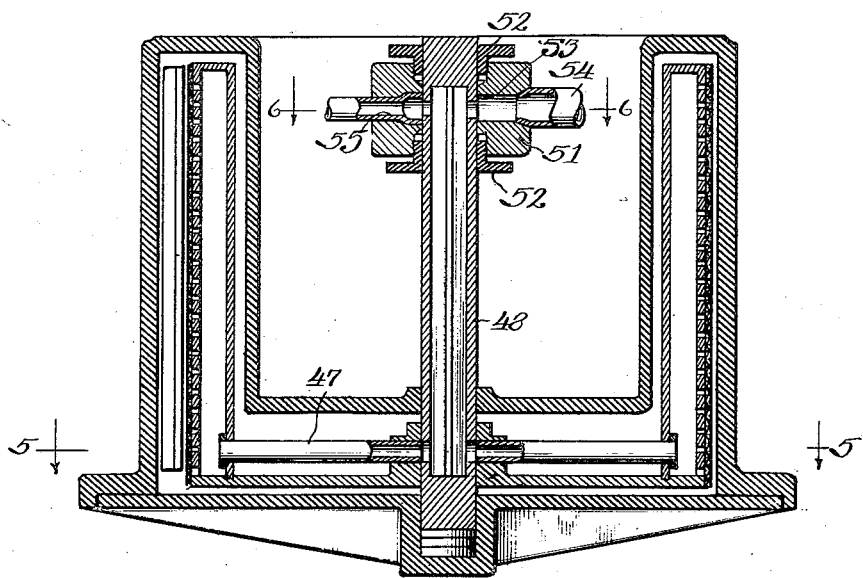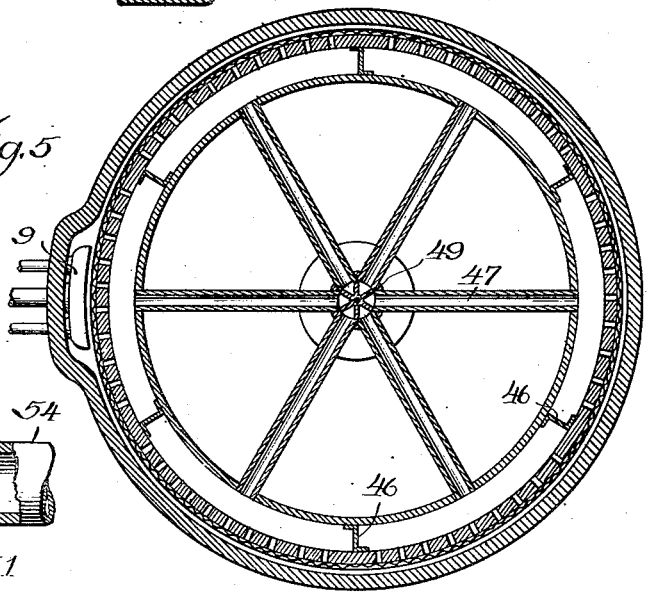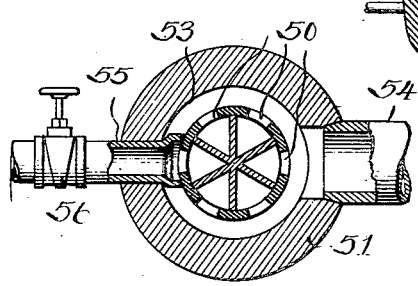

Patented Oct. 28, 1924.

1,512,977

UNITED STATES PATENT OFFICE.

OSCAR B. DEPUE, OF CHICAGO, ILLINOIS.

FILTRATION APPARATUS.

Application filed November 18, 1922. Serial No. 601,782.

*To all whom it may concern:*

Be it known that I, OSCAR B. DEPUE, a citizen of the United States, and a resident of Chicago, in the county of Cook and State of Illinois, have invented certain new and useful Improvements in Filtration Apparatus, of which the following is a specification.

This invention relates to improvements in filtration apparatus, and more particularly to apparatus for removing solid matter in suspension from liquids by the passage of the liquid to be filtered through a filtering medium under pressure.

While the foregoing characterization of the invention is descriptive of the general practice, the particular object is to improve the usual methods of filtration by providing for the continuous removal of the solid matter from the filtering medium or cloth in a new and novel method thereby maintaining the same constantly clean and avoiding the necessity of periodic interruption of the apparatus to remove the accumulation of the so-called "cake" which is ordinarily built up on the surface of the filter cloth.

A further object of the invention is to provide an improved construction for a filtering apparatus especially adapted for use in the process of decolorization of various liquid products by the mixture of an absorptive reagent, such as finely divided carbon, with the liquid to be treated, and the subsequent filtration of the reagent from the decolorized filtrate.

An understanding of the problems attending the usual methods of filtration in use will be gained from the following brief discussion.

In attempting to separate finely divided solids or other matter from the liquid in which they are held in suspension, it has generally been the practice to bring the liquid against the filtering surface under pressure to cause filtration. The solid matter is left behind as the liquid filters through the cloth, and a cake is built up on the filter surface in increasing thickness. As the depth of the cake grows, the filtering pressure must increase correspondingly to a point where it is not feasable to go further. Then the cake must be washed off and the cycle started over again. Methods have been employed whereby filtering has been carried on intermittently by frequently interrupting the pressure of the liquid against the filter surface and causing a counter current of filtered liquid to flow in a reverse direction through the cloth. However, when the unfiltered liquid has been held under pressure against the filter cloth, a certain amount of fine solids get into the meshes and the cloth never regains its first filtering capacity.

Attempts have been made to keep the filtering surface clean by causing a flow of the unfiltered liquid across the same, but practice shows this does not prevent particles from getting into the cloth and retarding filtration.

In the present method, the liquid to be filtered is forced through the filtering medium in the usual manner, but by the provision of a novel expedient, the filtering surface is constantly cleaned or freed from the accumulations of solid matter by the creation of areas of reduced pressure throughout the area of the filtering surface, causing the solid matter to become detached from the surface, and by the provision of suction means to remove the same from the apparatus. This method and the means of accomplishment will now be described in detail in connection with the accompanying drawings, wherein—

Figure 1:
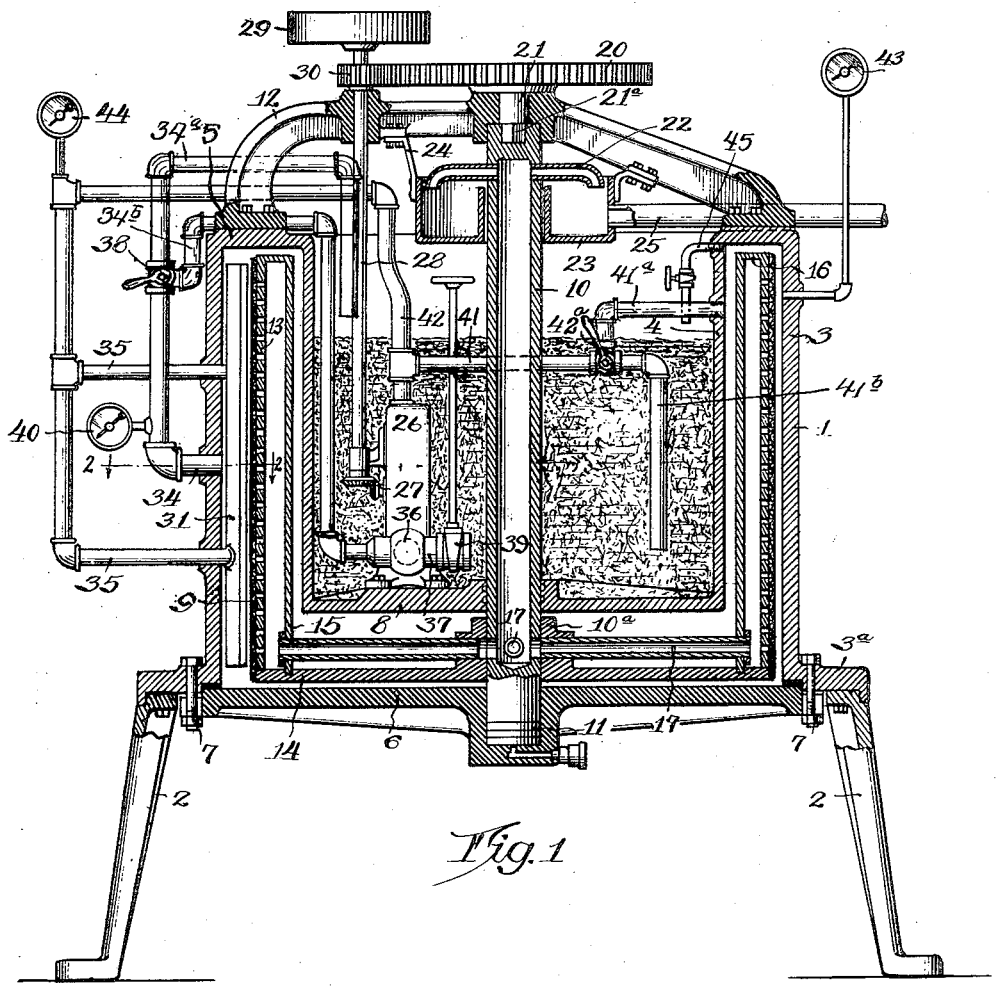
Fig. 1 is a view in vertical section through the filtering apparatus.
Figure 3:
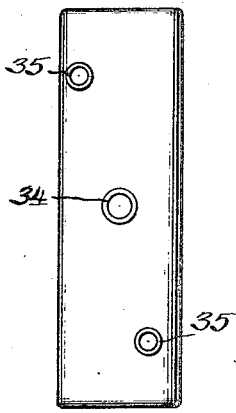

Fig. 3 is a detail view of the tubular casing forming the suction and pressure tubes of the cleaning device, Fig. 4 is a view in vertical section of a portion of the apparatus of Fig. 1, showing a modified construction of the filtrate discharge members, Fig. 5 is a cross-sectional view taken on line 5, 5 of Fig. 4, and Fig. 6 is an enlarged detail view in cross-section, taken on line 6, 6 of Fig. 4.

The apparatus herein illustrated and described is especially adapted for the process of filtration as applied to the art of decolorization hereinbefore referred to, and more particularly characterized by the repeated use of the same absorptive reagent which is mixed with a fresh supply of the liquid to be treated, with the necessary addition of fresh reagent to provide effective decolorization. However, the essential features of the invention are not limited to any particular process or method of filtration.

In general, the apparatus comprises an upright or vertical casing 1, preferably supported upon legs 2, or other suitable support. The casing 1 is open at its top and has a formation of a double walled structure, as will be understood from the following: Two annular walls in concentric relation form the outer wall 3 and inner wall 4, these being connected at the top of the receptacle by means of a top wall 5. About the lower edge of the outer wall 3 is a marginal flange 3ª which rests upon the legs 2. The bottom wall of the casing consists of a removable plate 6 held against the under face of the flange 3ª by means of a plurality of bolts 7 which may be loosened to allow the bottom plate 6 to be removed. Spaced above the removable bottom plate 6, and integral with the lower margin of the inner wall 4, is an inner bottom wall 8 which, with said side wall 4, forms an open receptacle or reservoir. The annular space between the inner and outer walls 3 and 4 forms the filter chamber and contains the elements of the filtering apparatus, said space communicating also with the space between the bottom plate 6 and wall 8.

Mounted within this space is the filtering element consisting of a rotative drum 9 mounted upon a hollow vertical shaft 10, extending axially of the receptacle, and having a bearing 11 at its lower end in the bottom plate 6, and at its upper end in a frame 12 which spans the open end of the receptacle and rests upon opposite sides of the top wall 5.

The drum consists of a perforated metallic shell 13 spaced a short distance from the outer wall 3 of the receptacle, and supported at its base upon an annular disc or plate 14 spaced just above the removable bottom plate and secured to the hollow shaft by means of an enlarged boss 10ª. Spaced inwardly from the perforated wall 13 of the drum is a wall 15 concentric therewith and forming an annular chamber closed at the top by means of a wall 16 connecting the upper edges of the walls 13 and 15 and closed at its lower end by the bottom wall 14 of the drum in which the lower edge of the inner wall 15 is anchored. Extending from the base of the hollow shaft 10 is a series of radial tubes 17 which pass through the inner drum wall and connect the inner chamber of the drum with said hollow shaft.

Figure 2:
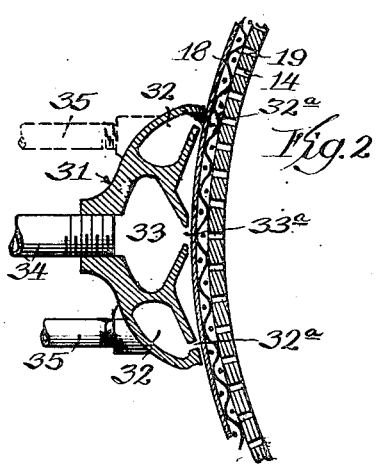
Fig. 2 is an enlarged detail view of the cleaning device in cross-section, taken on line 2, 2 of Fig. 1.

The outer or perforated wall of the drum carries the filtering medium 18, preferably a single thickness of filtering cloth, which is stretched over and around the entire cylindric surface so that all passage of liquid through the perforations must first pass through the filter cloth. As a preferable arrangement, an intermediate layer of wire mesh 19 of corrugated form is placed between the wall 13 and the filter cloth in order to obtain the required spacing for promoting effective filtration (Fig. 2).

In general, the filtering process takes place by the admitting of liquid under pressure into the space surrounding the drum and between the inner and outer side and bottom walls of the casing, the pressure forcing the filtrate through the filter cloth, thence through the perforations, into the chamber beyond, the solid matter manifestly being retained within and against the meshes of the filter cloth. The filtrate then escapes through the radial tubes into the hollow shaft and is finally led off through discharge pipes near its top, as will presently be described.

The drum is rotated for the purpose of more effectively cleaning the filter cloth, by driving mechanism operatively connected with the upper end of the hollow shaft 10, and consisting of a gear wheel 20 journalled centrally of the frame or bearing yoke 12, and connected with a stub shaft 21 having a squared end which extends into a square socket formed in the upper end portion of the hollow shaft at 21ª. Just below the upper end of the shaft are openings into which are fitted or screwed a plurality of radial tubes 22 having turned down ends opening into an annular trough 23 surrounding the shaft 10, said trough being suspended from the frame 12 by means of brackets 24. A discharge pipe 25 leads from the trough 23 to a suitable receptacle or other vessel for the receiving of the filtrate.

The arrangement of the radial tubes 22 and trough 23 is a convenient method of discharging the liquid from the rotating shaft, whereas the method of mounting the shaft permits the entire drum, together with the shaft, to be lowered below the receptacle by removing the bottom plate 6. Manifestly, access to the filtering surface is necessary for renewing the filter cloth as is required from time to time.

A unique feature of the apparatus herein disclosed is the utilization of the open receptacle or tank for the liquid to be filtered, and in which the absorptive reagent, such as carbon, is added. A pipe (not shown) leads from any suitable source of liquid supply to the reservoir, and the flow regulated so that the incoming or fresh liquid is substantially equal to the filtration capacity, thus maintaining a substantially constant level of the liquid therein.

As a further feature tending to afford a compact and unitary device is the mounting of a pump 26 within the tank, and supported upon the bottom wall 8, and offset to one side of the hollow shaft 10. The pump serves several functions, as will be presently disclosed, but primarily serves to force the liquid into the interior of the filtering chamber, and to maintain the same under what may be termed a predetermined filtering pressure. This pump is preferably of a self-contained type, such as a centrifugal pump, its rotor being driven through mitre gears 27 and a vertical shaft 28 extending upwardly from the reservoir, and having a bearing in the yoke 12. At the upper end of the shaft 28 is mounted a pulley 29 adapted to be drawn by a belt, although any form of power transmission may be employed. The shaft 28 likewise carries a drive pinion 30 meshing with the gear wheel 20, which drives the hollow shaft 10.

It is at once observed that the pump is submerged in the liquid to be filtered, this being not at all objectionable or detrimental to either pump or the liquid. In fact, the liquid acts as a lubricant for the pump bearings regardless of whether or not the liquid is a natural lubricant.

Before describing the pump connections in detail, the means for freeing the solid matter from the surface of the filter cloth, and the principle involved will be described.

At one point in the periphery of the filter drum and in close proximity to the surface of the filter cloth is mounted a vertical casing 31 extending the full height of the drum. As a preferable construction, the outer wall 3 is slightly enlarged or bulged outwardly to provide a space for this casing. This casing consists of a plurality of vertical tubes or passages closed at top and bottom and generally triangular in cross-section. These tubes may be further identified as a pair of outer pressure tubes 32, 32, and an intermediate suction tube 33, the former being spaced apart circumferentially from each other and flanking the latter tube, which is substantially twice the cross-sectional area of each pressure tube. The suction or intermediate tube 33 is arranged with its apex directed toward the surface of the drum, with a slot 33$^a$ extending the full height thereof. Similarly, the pressure tubes have an apex adjacent the surface of the filter cloth and longitudinal slots 32$^a$ extending the full length thereof, these slots opening directly against the surface of the cloth, although one or both may be directed more tangentially and outwardly from the intermediate suction slot 33$^a$, if desired.

Without tracing the connections of these tubes, it may be stated that each is provided with a separate pipe connection, to-wit, a pipe 34 leading into the back of the intermediate suction tube 33, and pipes 35, 35, leading to the pressure tubes 32, 32. These three pipes lead out through the outer wall of the receptacle, and thence become a part of the piping connections now to be described.

Considering first the single suction pipe 34, the same is divided into two branches 34$^a$ and 34$^b$ extending upwardly and thence laterally, one of said branches 34$^a$ opening into the tank and the other 34$^b$ leading to a T or branch fitting 36 on the suction side of the pump 26, said fitting having one opening direct to the interior of the receptacle at 37. A two-way valve 38 is mounted at the junction of the branch pipes 34$^a$ and 34$^b$. The supply to the pump is thus divided between two sources through the branch pipe 34$^b$, or direct from the tank. A valve 39 is mounted at the intake opening and controls the volume of liquid drawn from the tank. The valve 38 likewise controls the amount of liquid returned direct to the tank through the branch pipe 34$^a$, or to the pump through the branch pipe 34$^b$. It follows, therefore, that by the regulation of the valves 38 and 39, the desired degree of suctions may be attained.

Considering now the pipe connection of the discharge side of the pump, the same consists of two pipes 41 and 42 which branch from a single connection at the top of the pump. One pipe 41 extends laterally and then divides into two branches 41$^a$ and 41$^b$, the former communicating with the interior of the filter chamber, and the other extending downwardly, opening near the bottom of the tank. A two-way valve 43 is located at the junction of the branches 41$^a$ and 41$^b$ and regulates the amount of liquid that is delivered to the filter chamber or merely discharged into the body of the liquid in the receptacle for the purpose of promoting agitation. The other pipe 42 extends vertifically upwardly, and thence laterally to the outside of the receptacle, where it joins a vertical portion of the pipe from which the pressure pipes 35, 35 branch. In addition to the suction or vacuum gauge 40, other gauges are employed to indicate pressures on the delivery side of the pump. One of these gauges 43 communicates with the filter chamber and indicates the pressure of the liquid against the filtering surface, and the other 44 communicates with the pipe 42 leading to the pressure tubes 35, 35, and indicates the pressure of the liquid delivered therethrough.

The operation of the apparatus and particularly the manner in which the cleaning action is carried on, will now be discussed. The filtration process has already been described in a general way, so that it is understood that the liquid to be filtered is supplied to the reservoir at a rate to maintain a constant level therein. The nature of the liquid is not material, but, since the process of decolorization has been mentioned, it may be explained that there are a large variety of liquid products that require decolorization to produce them in commercial form. Sugar is a well known example of such a product, as well as various kinds of oils.

The decolorizing agent is preferably carbon in finely divided form, which is added to the liquid from time to time, thus maintaining a predetermined proportion of the decolorizing agent.

The liquid is obviously drawn into the pump through the intake opening 37, and forced into the filter chamber either through the branch pipe 41ª, or through the pipe 42, thence through the pressure tubes, depending on the setting of the valve 42ª. Moreover, by closing the valve 42ª to the branch pipe 41ª, the liquid will enter the filter chamber through the pressure tubes only, although a considerable volume will be returned to the tank through the branch pipe 41ᵇ, thus maintaining a constant circulation. From the filter chamber the liquid passes through the filter cloth into the drum as the filtrate, and thence to the delivery pipe 25 as already set forth. In short, the pump is calculated to maintain a constant filtering pressure, which may be varied with the character of the liquid being filtered, and the operating conditions of the apparatus. For the purpose of this discussion, a pressure of five pounds per square inch may be considered as suitable, this being indicated by the gauge 43. The passage of the liquid through the filter cloth under pressure manifestly deposits the solid matter upon the surface of the cloth, and unless removed, a "cake" is built up of gradually increasing thickness, thus retarding the filtration, and demanding an increasing pressure to force the liquid through the filtering medium. Contrariwise, the continuous removal of the solid matter maintains the cloth readily permeable, and permits the filtration process not only to be carried on continuously, but at its highest efficiency. The foregoing is the function of the suction and pressure tubes 34 and 35, which will now be described.

As already stated, the intermediate tube 33 with its slot 33ª extends the full width of the filter cloth and in close proximity thereto. Thus, if a suction is created in said tube, through the pipe 34, by its connection with the suction side of the pump, its action is that of dislodging the solid matter from the surface of the filter cloth, as it passes the slot in the revolution of the drum. This action, however, cannot be accomplished with complete satisfaction unaided, inasmuch as there would manifestly be a tendency for the unfiltered liquid, under the filtering pressure, to rush into the slot, thus interfering with the removal of the solid matter. Moreover, in the absence of means for neutralizing the pressure in the filter chamber an excessive amount of suction would be required to the detriment of the filter cloth. It is therefore contemplated that the discharge of liquid through the pressure tubes 32, 32 in the form of streams under high pressure from the slots therein, and impinging against the filtering surface on opposite sides of the suction slot 33ª, creates therebetween an area or chamber of low or reduced pressure, thus enabling the suction to act without interference from the external pressure. In other words, the stream of liquid issuing from the slotted tubes 32, 32 forms a curtain or dam on either side of the suction slot, thus maintaining that difference in pressures which is required to dislodge the particles of solid matter from the surface of the cloth, and to draw them into the suction tube 33. Manifestly, this is a matter of regulating the various pressures, it being understood that the suction may not necessarily be a partial vacuum so long as the pressure in the low pressure area is substantially less than that of the surrounding area. For example, if the filtering pressure is five pounds, the maintenance of a dam or curtain may be secured by a pressure of eight to ten pounds at the pressure tubes, and the removal of the solid matter may be accomplished at suction of say one inch of vacuum, or even at atmospheric pressure. On the other hand, it is possible to increase the pressure in the filter chamber to say twenty-five pounds, and the pressure in the tubes to say thirty-five pounds, in which case suction will take place with a pressure of more than atmospheric in the suction tube. In short, the point to be emphasized is that the cleaning action is the result of a proper relation between the pressures at the several points, rather than the application of any specific pressures or vacuums.

The maintenance of the proper operating pressures determined largely by experiment is obtained by the regulation of the various valves in the piping system. For instance, by closing the valve 39 at the intake opening to the pump, the suction at the tube 33 is increased since the pump draws in a greater proportion from the latter source. Moreover, the suction in the tube 33 may be controlled independently by the valve 38, in the pipe 34, and so also on the pressure or discharge side of the pump, the filtering pressure is controlled by the valve 42ª in the pipe 41, which also controls the pressure in the tubes 35, 35, since both are branches from the same pump connection. The pressure in the filter chamber may also be controlled by a valved overflow pipe 45 leading from the upper portion of the filter chamber into the reservoir. This overflow pipe also prevents the formation of an air pocket in the upper part of the filter chamber.

It is manifest from the foregoing description that the principal result to be obtained is the relative movement of the cleaning members and the filter surface, with sufficient rapidity to keep the cloth at its maximum of filtering capacity. It follows, therefore, that it is quite immaterial whether the filter rotates and the cleaning device is stationary, as disclosed, or vice versa, so long as there is relative movement which results in the entire area being recurrently subjected to the cleaning action.

Moreover, the method involved is to be clearly distinguished from the so-called "back-washing" methods, or methods which necessitate a periodic interruption of the filtration, or the reversal of the process, as is the case in back-washing the residue from the filter surface. This distinction at once suggests an important advantage of the present method, namely, that the cleaning action not only begins at the commencement of the filtration process but is carried on simultaneously therewith so that it is unnecessary to interrupt the filtering process, or put it out of commission for the purpose of removing the cake on the filter surface. Moreover, as already suggested, the filtering capacity is maintained at its maximum, and hence the operation of the entire apparatus at its highest efficiency.

Although the apparatus as disclosed heretofore is calculated to perform its function satisfactorily, it may be desirable under certain conditions to assist the cleaning action by neutralizing the filtering pressure throughout successive areas of the filter cloth as they are acted upon by the cleaning member. By the disclosure of such means, about to be described, it is not to be understood that its use is essential to obtaining the desired results, but rather as a means for assisting the cleaning action.

The incorporation of the added feature requires certain alteration in the structure, but limited, however, to the filter drum, the hollow shaft, and the filtrate take-off connection from said shaft.

In the foregoing description, the interior of the drum was considered to be completely open so as to allow the free circulation of the filtrate around the annular chamber behind the filter surface. In the modified construction, this chamber is divided into sections by means of a series of vertical dividing walls 46 extending transversely between the outer and inner walls of the filter drum (Fig. 5). The number and location of these walls is governed by the number and disposition of the radial delivery pipes 47 leading to the vertical shaft 48. Thus, six radial pipes are shown (Fig. 5) and hence an equal number of sections or divisions are formed by locating a dividing wall midway between each pipe, thus providing each section with one of said radial delivery pipes. In somewhat the same manner the hollow shaft is divided into six vertical passages, by fitting into the shaft a partition member 49, consisting of six radial blades, so that each radial pipe 47 communicates with a separate vertical passage. Near the upper end of the shaft a series of six ports 50 are formed, each port communicating with one of the six vertical passages (Fig. 6). Surrounding the upper end of the hollow shaft 48 is a delivery block 51 held stationary between two bearing collars 52, 52. In the delivery block is formed an annular delivery channel 53 which communicates with a main delivery pipe 54, and is adapted to register with the several ports 50. This delivery channel 53 completely surrounds the shaft and therefore is in direct communication at all times with all of the ports with the exception of the port directly opposite the outlet to the pipe 54. The cutting off of each port successively is accomplished by a pipe or tube 55 which passes radially through the delivery block at a point diametrically opposite the main delivery pipe 54 and terminates in sealing contact with the shaft, and in the plane of the ports 50. The end of the pipe is preferably flared and a suitable sealing contact between the surfaces provided. This pipe 55 leads to any delivery source, as does the main pipe 54. Moreover, a valve 56 is mounted in this pipe (Fig. 6).

Before describing the action of these elements, a further relationship is to be pointed out, namely, that the location of the port sealing pipe 55 is disposed in the same vertical plane as the cleaning member 9. Thus, by comparing Figs. 5 and 6, and assuming that the drum is stationary, it will be seen that the cleaning member is acting on a single section of the drum, said section being connected with a single radial tube 47, which in turn communicates with a single vertical passage, and that passage at the same instant has its port 50 sealed by the pipe 55. Now, if the drum is put in motion, it follows that as each section of the drum passes the cleaning device the corresponding port 50 is sealed by the pipe 55, and the resulting action is as follows:

Bearing in mind that a pressure of, say five pounds, is exerted against the entire outside area of the filter surface, it is manifest that if a counter or back pressure is exerted on the opposite or inside surface of the drum, the effect will be a neutralizing of the filter pressure throughout the area of a given section of the filter surface. Thus, if the filter surface of each section of the drum is successively subjected to the counter or back pressure as it is being cleaned, the particles of solid matter tend to adhere less firmly to the filter cloth, permitting them to be more readily removed by the suction element of the cleaning device. In other words, the temporary counteracting or neutralizing of the pressure tending to force the particles through the filter cloth, frees the particles from the surface, thus promoting a more complete and thorough cleaning action.

The degree of pressure neutralization depends on the operating conditions. For instance, if the chamber behind the filter cloth is full of liquid, as would be the case if the delivery of the filtrate was carried on against a fluid head, it would follow that by closing the ports 50 one after another, the liquid column would instantly exert a back pressure substantially equal to the filter pressure and the pressure on both sides of the filter area of each section being cleaned would be in equilibrium. As a practical matter, a certain degree of leakage would be present so that in all probability a complete equilization of pressures would not be obtained. However, a material counteracting of the filter pressure would be manifested, and thus the cleaning action materially assisted and promoted.

Since the sealing of the ports successively is the fundamental purpose of the pipe 55, it is not altogether necessary to employ a pipe, although it is desirable, since to start the action a flow through the pipe is required to remove any air and to establish a column of liquid in the vertical passages, this being done by opening the valve 56 and then closing it after the action has commenced. Furthermore, the same result in a measure may be obtained by allowing a restricted flow through the pipe 55 controlled by said valve 56.

It may again be repeated that the basic principle of filter cleaning herein disclosed is in no wise dependent upon the counteracting or neutralizing of the filtering pressure, although as explained, it would undoubtedly be of considerable advantage as an aid in the cleaning action.

Certain structural advantages result from the arrangement and design of the apparatus, among which is the utilization of the central portion of the casing as a tank for the liquid in place of a separate tank. This coupled with the mounting of the pump within the tank, provides a compact and self-contained unit. These structural features, however, may be modified without departing from the spirit of the invention. A very obvious departure would be to design the apparatus horizontally instead of vertically, in which case the tank would be closed at both ends, or else a separate tank provided for the unfiltered liquid supply.

Having described the preferred embodiment of the invention, I claim—

1. In a filtering apparatus of the class described, the combination, of a filtering medium through which the liquid to be filtered is forced under pressure, means acting to remove the accumulation of solid matter from the surface of said medium and coacting means for creating an area of reduced pressure adjacent the point of removal.

2. In a filtering apparatus of the class described, the combination of a filtering medium through which the liquid to be filtered is forced under pressure, a member acting on the surface of said medium for removing the accumulation of solid material, and coacting means for creating an area of reduced pressure at said surface and adjacent said material removing member.

3. In a filtering apparatus of the class described, the combination with a filtering medium through which the liquid to be filtered is forced under pressure, of means for removing the accumulation of solid matter from said medium, comprising a suction member, and means for creating a reduced pressure area adjacent said suction member.

4. In a filtering apparatus, the combination of a filtering medium through which the liquid to be filtered is forced under pressure, and means for maintaining said medium free of accumulations of solid material, comprising a suction discharge member mounted adjacent the surface of said filter medium, means for creating an area of reduced pressure around said discharge member, and means for exposing the entire area of said filtering medium intermittently to said suction discharge member.

5. In a filtering apparatus, the combination of a filtering medium through which the liquid to be filtered is forced under pressure, means for maintaining said medium free of accumulations of solid material comprising a slotted suction discharge member mounted adjacent the surface of said filter medium, and means for creating an area of reduced pressure surrounding the slot in said suction discharge member.

6. In a filtering apparatus, the combination of a casing in which the liquid to be filtered is forced under pressure, a filtering medium in said casing comprising a surface of filtering material, a tube mounted in said casing and provided with an opening adjacent the filtering surface, means for creating suction in said tube, and means for creating around the opening of said tube an area of reduced pressure substantially less than the pressure of the surrounding liquid.

7. In a filtering apparatus, the combination of a casing in which the liquid to be filtered is forced under pressure, a filtering medium in said casing comprising a surface of filtering material, a tube mounted in said casing and provided with an opening adjacent the filtering surface, means for creating suction in said tube, means for creating around said opening of said tube an area of reduced pressure substantially less than the pressure of the surrounding liquid, and means for imparting relative movement between said filtering medium and said tube.

8. In a filtering apparatus, the combination of a casing in which the liquid to be filtered is forced under pressure, a filtering medium in said casing comprising a surface of filtering material, a suction tube mounted adjacent the surface of said filtering medium, and having a slot therein, and a pressure tube extending parallel to said suction tube and having a slot therein, the pressure in said suction and pressure tube being respectively substantially less than and greater than the pressure within said casing.

9. In a filtering apparatus, the combination of a casing in which the liquid to be filtered is forced under pressure, a filtering medium in said casing comprising a surface of filtering material, a plurality of slotted passages mounted in close proximity to the surface of said filtering medium, and comprising an intermediate suction passage and a pair of pressure passages on either side thereof, and means for discharging liquid from said pressure passages at a substantially greater pressure than that of the liquid in said casing.

10. In a filter of the class described, the combination of a casing, a filtering medium comprising a cylindric filtering surface, means for supplying the liquid to be filtered to said casing under pressure, means for removing the accumulations of solid material from the filtering surface comprising a plurality of longitudinal passages having slots opening toward the filtering surface, means for creating suction in the intermediate passage and means for discharging a portion of the liquid to be filtered from the outer passages under a pressure substantially greater than the filtering pressure.

11. In a filtering apparatus of the class described, the combination of a casing, a rotative drum mounted in said casing having a cylindric filtering surface, a pump for supplying the liquid to be filtered to said casing under pressure, a plurality of tubes mounted in said casing axially of said drum and having a slot opening adjacent the filter surface, one of said tubes being connected to the pressure side and the other to the suction side of said pump.

12. In a filtering apparatus of the class described, the combination of a casing, a rotative drum mounted in said casing having a cylindric filtering surface, a pump for supplying the liquid to be filtered to said casing under pressure, a tube extending axially of said drum and having a longitudinal slot facing the filtering surface, and a pair of tubes on either side of said first mentioned tube and provided with slots opening toward said filtering surfaces and pipe connections from the suction and pressure sides of said pump to said first mentioned tube and last mentioned tubes respectively.

13. In a filtering apparatus of the class described, the combination of a casing, a rotative filter drum mounted in said casing, means for introducing into said casing under pressure the liquid to be filtered, suction means for removing the accumulation of solid matter from the surface of said drum, and means for reducing the effective pressure on the solid matter as it is subjected to the action of said suction means.

14. In a filtering apparatus of the class described, the combination with a casing, a rotative filter drum mounted in said casing and through which the liquid to be filtered is forced under pressure, suction means for removing the accumulation of solid matter from the surface of said drum, and means for forming a dam around said suction means whereby an area of reduced pessure is created.

15. In a filtering apparatus of the class described, the combination of a casing into which the liquid to be filtered is forced under pressure, a filter drum rotatable in said casing and having a cylindric filter surface, a suction tube mounted in said casing and having a slot adjacent said filter surface, said drum being divided circumferentially into sections, and means for creating a counter-pressure in successive sections as they are subjected to the action of said suction tube.

16. In a filtering apparatus, the combination of a casing, a filter drum mounted in said casing and comprising a plurality of sections, a filtrate delivery tube connected with each section, a suction member acting on the surface of said drum for removing the accumulations of solid material, and movable relative thereto, and means for shutting off the flow of liquid from each section as it is subjected to the action of said suction member.

17. In a filtering apparatus, the combination of a casing, a filtering drum mounted in said casing and having a filtering surface through which the liquid to be filtered is forced under the pressure in said drum, means for maintaining said medium free of accumulations of solid material comprising a suction discharge member mounted adjacent to and exterior of the surface of said filter medium, means for creating an area of reduced pressure between said discharge member and the filter surface, and means for creating a counter pressure within said drum and throughout successive areas of the filter surface.

18. In a filtering apparatus, the combination of a casing in which the liquid to be filtered is forced under pressure, a rotative filtering drum in said casing comprising a plurality of sections, a discharge pipe communicating with each section and leading to a common discharge pipe, a suction tube in said casing having a slot adjacent the filter surface, and means for successively closing the outlet from said delivery pipes whereby a counter pressure is created in said sections as each is subjected to the action of said suction tube.

19. In a filter of the class described, the combination of a casing, a filtering drum rotatively mounted in said casing comprising a cylindric filtering surface through which the liquid to be filtered enters said drum under pressure, said drum being divided radially into a plurality of sections, delivery pipes connected with each section, a plurality of slotted passages arranged adjacent the filtering surface, means for creating suction in the intermediate passage and for discharging a portion of the liquid to be filtered from the outer passages under a pressure substantially greater than the filtering pressure, means for creating a counter pressure in each section as its surface is subjected to the action of said tubes.

In witness whereof, I hereunto subscribe my name this 16th day of November, A. D., 1922.

OSCAR B. DEPUE.